Oct. 11, 1932.    E. MORTERUD    1,882,391
APPARATUS FOR DIGESTING WOOD PULP
Filed Sept. 4, 1929

Inventor:-
Einar Morterud
by
Attys.

Patented Oct. 11, 1932

1,882,391

UNITED STATES PATENT OFFICE

EINAR MORTERUD, OF TORDEROD, NEAR MOSS, NORWAY

APPARATUS FOR DIGESTING WOOD PULP

Application filed September 4, 1929, Serial No. 390,389, and in Norway September 10, 1928.

In the digestion of wood pulp wood chips are exposed to the action of aqueous solutions of chemical agencies, which at a suitable temperature has the effect of solving the intercellular substances of the wood.

According to the known digesting processes (sulfite, sulfate and soda methods), the wood chips after some suitable preliminary treatment have been "cooked" in a suitable solution of chemical agencies, i. e. the wood chips have been placed in a closed vessel which is wholly or partly filled with solution liquid (liquor), said liquid being maintained at a suitable temperature in some suitable manner (injection of steam, circulation through calorisator etc.).

Owing to the ratio between the specific weight of the wood chips and the liquor, it is necessary in a process of this kind to use a considerably larger quantity of liquor than the quantity which is theoretically sufficient under the highest permissible concentration to solve the intercellular substances of the wood to be digested.

Even in the sulfate process in which the level of liquor does not usually reach the top of the wood chip filling, it is unavoidable when digesting in this manner, that there is used a quantity of liquor which is approximately double the quantity theoretically necessary for carrying out the digesting process.

The use of a larger quantity of liquor than theoretically necessary, has the effect of lowering the heat economy of the process for the reason that a substantial part of the heat supply is utilized for heating the liquor, as well as for the reason that the liquor on a later stage has to be evaporated in order to regenerate the chemicals used in the process.

The present invention has for its object a digesting process of the kind referred to, which may be carried out with the least possible quantity of liquor, and in order to obtain this, the wood chips, instead of being treated by the liquor in a more or less submerged condition, are exposed through the whole of the digesting process to a shower of liquor which is allowed to percolate through the wood chips, the liquor being afterwards collected in a tank or vessel placed below the digester from which it is passed through a heating apparatus back to the shower arrangement at the top of the digester. The tank or vessel in which the liquor collects after having percolated through the wood chips may be separated from the digester or may be formed by the lower part thereof.

By carrying out the whole digesting process in this manner instead of treating the wood chips during the whole or part of the process in a more or less submerged condition, it is possible to reduce the quantity of liquor necessary for the treatment, practically to the amount theoretically necessary, whereby the economy of the process is largely increased.

Further, in accordance with the process according to the present invention, one obtains the advantage that the percolating liquid from a number of different digesters may be conducted to a common collecting vessel whereby the cost of constructing the plant is reduced.

Also in accordance with the present process, a number of percolating tanks for treatment of wood chips may be combined with several collecting vessels for the circulating percolation liquor, with the object of performing the preliminary treatment of the wood chips with a liquor of reduced strength, and afterwards supplying fresh full strength liquor.

The fresh, full strength liquor after having been percolated through one percolating vessel may then be used for the preliminary treatment of the wood in another percolating vessel. Finally, weak liquor or water may be percolated through the wood chips in order to wash the same and prevent loss of chemicals.

The number of steps in the process will depend on the material as well as on the desired degree of purity and other factors.

On the drawing some forms of the invention are diagrammatically illustrated.

Figure 1:
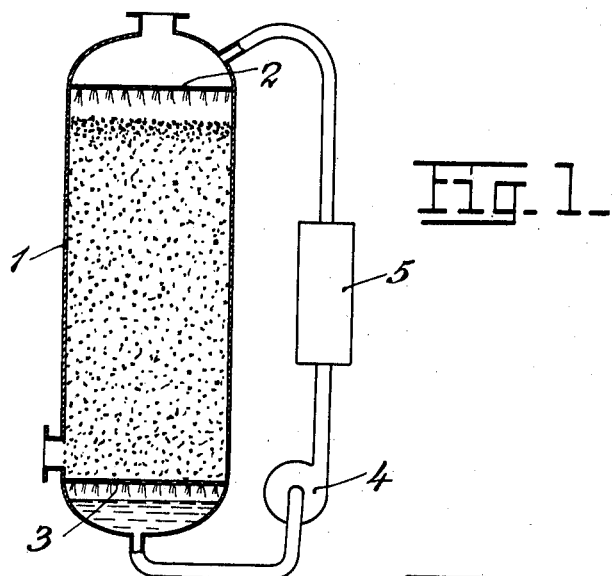
Figure 1 is a diagrammatical vertical sectional view of the invention.

On Fig. 1, 1 is the percolating vessel which is provided at the top with a shower arrangement 2, and near the bottom with a sieve or screen 3. The percolating liquor collects in the lower part of the percolating vessel and is carried by means of pump 5 through heating apparatus 5 back to the shower arrangement 2 in the upper part of the percolating vessel.

It will be understood that the heating device 5, by means of which the circulating liquor is heated, may be of any known type, and the heating of the liquor in this heating arrangement may take place directly by the injection of steam or indirectly by means of heating tubes or the like.

Further it will easily be understood that the circulating pump 4 and heating device 5 need not necessarily be located outside the percolating vessel, as it will make no difference to the present invention whether they be placed outside or inside the digesting or percolating vessel in a known manner.

In all cases the supply of heat to the circulating liquor will, however, take place during a part of the circulation at which the liquor is separated from the wood chips.

According to the form of the invention illustrated on Fig. 1, and in which the liquor after percolating through the wood chips collects in the bottom part of the percolating vessel, the sieve or screen 3 near the bottom of the vessel may be adapted to carry the whole weight of the wood chips, or it may also be adapted only to prevent wood chips to follow the liquor to the circulating pump, the amount of percolating liquid being in that case adjusted so as to maintain the level of liquid a sufficient height above the outlet opening leading to pump 4.

Figure 2:
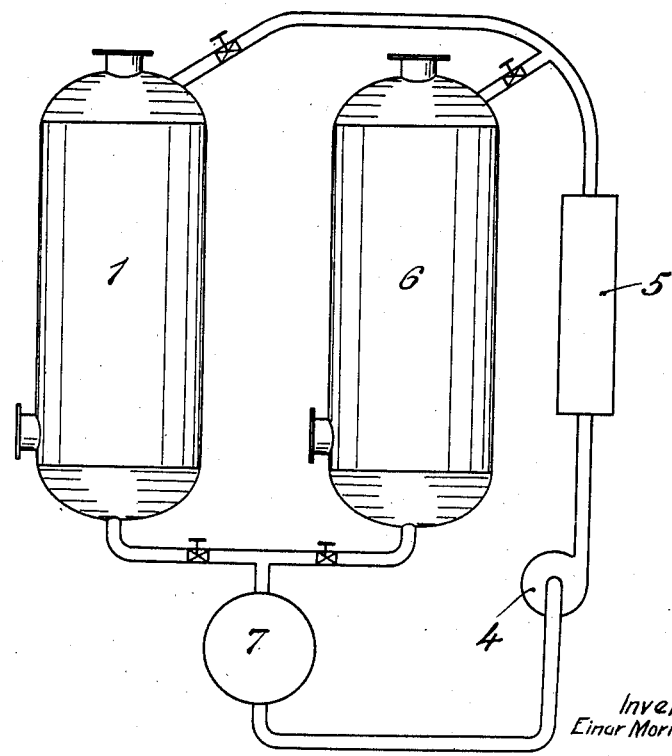
Figure 2 is an elevational view of a modified form of the invention.

In accordance with the form of the invention illustrated on Fig. 2, two percolating vessels 1 and 6 are connected to a common collecting vessel 7 for percolating liquor. From collecting vessel 7 the liquor is passed by means of pump 4 through heating apparatus 5 to one or the other of vessels 1 and 6. During the time in which one vessel is emptied and recharged, the collecting vessel 7 is then connected only with the other percolating vessel.

As it has been mentioned above, it is also possible to use two or more collecting vessels adapted for liquor of different strength and adapted to be connected with several percolating vessels.

I claim:

1. In a digesting plant for wood pulp the combination with two or more percolating vessels adapted to hold the material to be digested of a collecting vessel for the digesting liquor situated below and separated from said percolating vessels conduits for connecting the several percolating vessels with the said collecting vessel, a pump for removing the liquor from said collecting vessel, a heating device for heating the liquor removed from the collecting vessel and valve controlled conduits for returning the reheated liquor to the percolating vessels.

2. In a digesting plant for wood pulp the combination with two or more percolating vessels adapted to hold the material to be digested of two or more collecting vessels for digesting liquor situated below and separated from said percolating vessels, valve controlled conduits for connecting each of said percolating vessels individually with each of said collecting vessels, valve controlled conduits for returning the liquor from each of said collecting vessels to each of said percolating vessels, and means for heating said liquor between said collecting vessels and said percolating vessels.

In testimony whereof I affix my signature.

EINAR MORTERUD.